US007594976B2

(12) United States Patent
Emslander et al.

(10) Patent No.: US 7,594,976 B2
(45) Date of Patent: Sep. 29, 2009

(54) METHODS OF MANUFACTURING SUBSTRATES

(75) Inventors: Jeffrey O. Emslander, Afton, MN (US); John R. David, Stillwater, MN (US); Ronald S. Steelman, Woodbury, MN (US); Danny L. Fleming, Stillwater, MN (US); Robert K. Galkiewicz, Roseville, MN (US); Graham M. Clarke, Woodbury, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 434 days.

(21) Appl. No.: 11/129,458

(22) Filed: May 13, 2005

(65) Prior Publication Data

US 2006/0254702 A1 Nov. 16, 2006

(51) Int. Cl.

| | |
|---|---|
| ***B29C 47/06*** | (2006.01) |
| ***B31F 1/07*** | (2006.01) |
| ***B29C 65/72*** | (2006.01) |
| ***B44C 5/04*** | (2006.01) |
| ***G02F 1/1333*** | (2006.01) |
| ***B29C 59/00*** | (2006.01) |
| *B29C 47/08* | (2006.01) |
| *B29C 65/48* | (2006.01) |
| *B29C 59/04* | (2006.01) |
| *B44C 3/08* | (2006.01) |

(52) U.S. Cl. .................. 156/244.16; 156/196; 156/199; 156/209; 156/219; 156/220; 156/244.11; 156/246; 156/247; 156/277; 156/289; 349/110; 349/111; 349/114; 264/1.7; 264/1.9; 264/132; 264/133; 264/293

(58) Field of Classification Search ... 428/195.1–211.1, 428/135, 690, 913, 913.3; 349/110, 111, 349/114; 264/1.7, 1.9, 132, 135, 173.1, 293; 156/196, 199, 209, 219, 220, 221, 244.11, 156/244.16, 245, 246, 247, 289, 291
See application file for complete search history.

(56) References Cited

U.S. PATENT DOCUMENTS

| | | | | |
|---|---|---|---|---|
| 3,247,005 | A | 4/1966 | Parry et al. | |
| 3,515,619 | A | 6/1970 | Barnette | |
| 3,672,894 | A | 6/1972 | Glenn, Jr. | |
| 3,888,029 | A | 6/1975 | Schubert | |
| 4,217,378 | A | 8/1980 | Pizur, Sr. | |
| 4,605,461 | A * | 8/1986 | Ogi | 156/233 |
| 4,673,609 | A * | 6/1987 | Hill | 428/187 |
| 4,720,317 | A * | 1/1988 | Kuroda et al. | 156/250 |
| 5,142,274 | A | 8/1992 | Murphy et al. | |
| 5,142,415 | A | 8/1992 | Koehnle | |
| 5,204,160 | A | 4/1993 | Rouser | |
| 5,356,705 | A | 10/1994 | Kelch | |
| 5,525,177 | A | 6/1996 | Ross | |

(Continued)

FOREIGN PATENT DOCUMENTS

DE 28 56 391 7/1980

(Continued)

*Primary Examiner*—Philip C Tucker
*Assistant Examiner*—Sonya Mazumdar
(74) *Attorney, Agent, or Firm*—Colene H. Blank

(57) ABSTRACT

The present application is related to substrates having light transmitting areas and light shielding areas. The application discloses methods of manufacturing the substrates, including modifying a light shielding layer be contact to a structured surface.

26 Claims, 1 Drawing Sheet

U.S. PATENT DOCUMENTS

| | | | | |
|---|---|---|---|---|
| 5,549,774 | A | 8/1996 | Miekka | |
| 5,560,799 | A * | 10/1996 | Jacobsen | 156/277 |
| 5,571,598 | A | 11/1996 | Butler et al. | |
| 5,591,527 | A | 1/1997 | Lu | |
| 5,612,119 | A * | 3/1997 | Olsen et al. | 428/32.71 |
| 5,733,628 | A | 3/1998 | Pelkie | |
| 5,872,656 | A | 2/1999 | Horwill et al. | |
| 5,925,437 | A | 7/1999 | Nelson | |
| 5,939,168 | A | 8/1999 | Andriash | |
| 5,962,109 | A | 10/1999 | Schwietz | |
| 6,106,922 | A | 8/2000 | Cejka et al. | |
| RE37,186 | E | 5/2001 | Hill | |
| 6,226,906 | B1 | 5/2001 | Bar-Yona | |
| 6,254,711 | B1 | 7/2001 | Bull et al. | |
| 6,258,429 | B1 | 7/2001 | Nelson | |
| 6,386,699 | B1 | 5/2002 | Ylitalo et al. | |
| 6,507,413 | B1 | 1/2003 | Mueller et al. | |
| 6,521,325 | B1 | 2/2003 | Engle et al. | |
| 6,577,355 | B1 | 6/2003 | Yaniv | |
| 6,649,249 | B1 | 11/2003 | Engle et al. | |
| 6,650,470 | B1 | 11/2003 | Turner et al. | |
| 6,714,270 | B2 | 3/2004 | Seiki et al. | |
| 6,993,872 | B2 | 2/2006 | Katsuragawa | |
| 7,050,227 | B2 * | 5/2006 | Olofson et al. | 359/443 |
| 7,086,146 | B2 * | 8/2006 | Shimamura et al. | 29/831 |
| 2002/0034608 | A1 | 3/2002 | Aeling et al. | |
| 2002/0155952 | A1 | 10/2002 | Furukawa | |
| 2003/0003273 | A1 | 1/2003 | Izutani et al. | |
| 2003/0161017 | A1 | 8/2003 | Hudson et al. | |
| 2003/0215628 | A1 | 11/2003 | Ma et al. | |
| 2004/0090399 | A1 | 5/2004 | Bal-Yona et al. | |
| 2004/0095645 | A1 | 5/2004 | Pellicori et al. | |
| 2004/0126531 | A1 | 7/2004 | Harvey et al. | |
| 2004/0190144 | A1 * | 9/2004 | Hannington | 359/614 |
| 2004/0216406 | A1 | 11/2004 | Egashira | |
| 2005/0020604 | A1 | 1/2005 | Chiang et al. | |
| 2005/0140927 | A1 | 6/2005 | Aeling et al. | |
| 2005/0270604 | A1 | 12/2005 | Drinkwater | |
| 2006/0017979 | A1 | 1/2006 | Goggins | |

FOREIGN PATENT DOCUMENTS

| | | |
|---|---|---|
| DE | 3436065 | 4/1986 |
| DE | 29622671 | 6/1997 |
| DE | 19642001 | 4/1998 |
| EP | 0 389 274 | 9/1990 |
| EP | 1 577 358 | 9/2005 |
| GB | 2 358 513 | 7/2001 |
| GB | 2381116 | 4/2003 |
| JP | 2002-296408 | 10/2002 |
| WO | WO 97/47481 | 12/1997 |
| WO | WO 00/74026 | 12/2000 |
| WO | WO 03/034377 | 4/2003 |
| WO | WO 2004/042684 | 5/2004 |
| WO | WO 2004/044875 | 5/2004 |
| WO | WO 2005-005162 | 1/2005 |

* cited by examiner

METHODS OF MANUFACTURING SUBSTRATES

FIELD

The present application is related to substrates having light transmitting areas and light shielding areas.

BACKGROUND

The design and production of unidirectional graphic articles is known and described, for example in U.S. Pat. No. 6,254,711 entitled "Method for Making Unidirectional Graphic Article" and assigned to the same assignee as the instant application.

While unidirectional graphic articles are useful in a number of display environments, these articles typically provide only one display option, for example a reflected image in a first lighting condition. That is, an image can be seen (from the viewing side of the article) in high brightness conditions such as daylight, and the image is not visible (from the viewing side of the article) in low brightness conditions such as nighttime.

Dual display films and systems are also described in the art, to provide multiple display options. That is, a film capable of showing a reflected image in a first lighting condition and a transmitted image or series of images in a second lighting condition. Examples of such films are shown, for example, in U.S. Pat. Nos. 3,888,029; 5,962,109; 6,226,906; 6,577,355; and publication numbers WO 2004042684, WO9747481, and U.S. 20040090399.

SUMMARY

However, previous dual display films and systems have a low image quality, especially when viewed close to the film. Also, many dual display systems are electronic, creating a difficulty when used outdoors. Dual substrates having high image quality, and both static and active images are desired. Additionally, a multiple display with limited electronic parts is desirable.

The present application is directed methods of manufacturing dual image substrates. In one embodiment, a method of manufacturing an article is disclosed. The method comprises providing a substantially continuous light shielding film; providing a light transmitting film having a structured surface; and contacting the light shielding film with the structured surface of the light transmitting film to form a composite film with a light shielding layer and a light transmitting layer, wherein after contacting, the composite film has light transmitting areas and light shielding areas.

In another embodiment, a method of manufacturing an article is disclosed comprising providing a substantially continuous light shielding film; providing a carrier web; structuring the surface of the light shielding film opposite the carrier web, wherein after structuring, the light shielding film has relatively thin light transmitting areas; and removing the carrier web, wherein at least a portion of the relatively thin light transmitting areas remain on the carrier web.

In another embodiment, a method of manufacturing an article is disclosed comprising providing a substantially continuous light shielding polymer film; providing a substantially continuous light transmitting molten polymer film; introducing the light shielding molten polymer film and the light transmitting molten polymer film to a structured surface, wherein the structured surface contacts the light shielding film; forming a substantially continuous composite film on the structured surface, wherein the composite film comprises light shielding areas and light transmitting areas; and removing the composite film from the structured surface.

DETAILED DESCRIPTION

Figure 1:
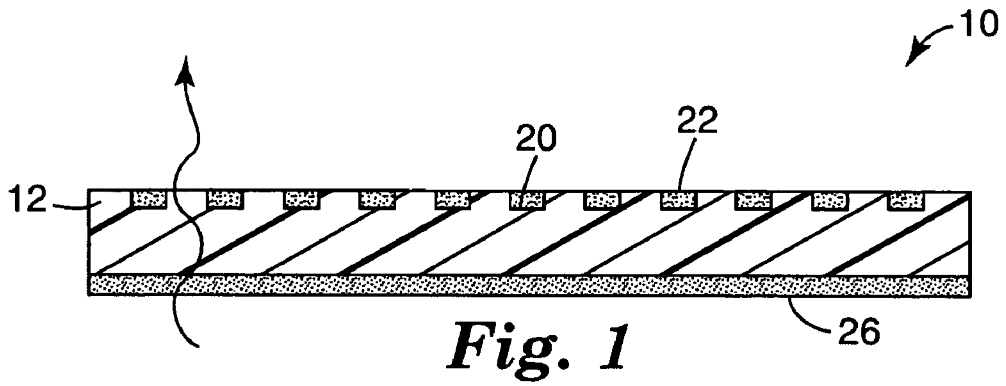
FIG. 1 is a cross sectional view of a film representing an embodiment of the present invention.

For the purpose of the present application, the following terms are defined.

An image may comprise a solid color field, a likeness of something (which may include many colors, e.g. a square, a car or a pattern,) or combinations thereof.

A color includes black, white, and any color within the visible spectrum of colors.

The present application is directed to substrates. Specifically, display substrates that are capable of providing a dual functionality. For example, a first major surface of a substrate having dual functionality capability may have a first appearance in a first lighting condition (e.g. a front light condition), and a second appearance in a second lighting condition (e.g. a back light condition), when viewed from the same side of the film (i.e. viewed on the first major surface). In some embodiments, the substrate as a whole is specularly transmissive. In other embodiments, the substrate as a whole is not a specularly transmissive i.e. a viewer is unable to view through the substrate, from either side, to see something on the other side.

Generally, a reflective image creates the first appearance of the substrate. Generally, in a first lighting condition with the light source on the same side of the substrate as the first major surface (i.e. reflected light or front light), the reflective image will become a visible reflected image. A reflective image may include a likeness of something and/or a solid color field. The solid color can be a coating on the film or a color additive within the film.

In certain embodiments, a transmitted image creates the second appearance of the substrate. A transmitted image may exist on the second major surface of the substrate opposite the first major surface, and is visible on the first major surface in a second lighting condition. A second lighting condition is, for example, light from an illumination source, i.e. the illumination source is on the opposite side of the substrate from viewer (i.e. transmitted light or back light.) A transmitted image may include a likeness of something, a transmitted light and/or a solid color field. The illumination source may be, for example lightbulbs, light emitting diodes, photoluminescent films, electroluminescent films, etc.

Generally, in a front light or reflected light condition, the reflective image is visible and the transmitted image is not visible. Generally, in a back light or transmitted light condition, the transmitted image is visible and the reflective image is not visible. In some lighting conditions, both the reflective image and the transmitted image are visible, to some extent, over all or part of the display.

The substrates described herein generally comprise light transmitting areas and light shielding areas. The properties of the light shielding areas and light transmitting areas are chosen to maximize the appearance of the reflective image and the transmitted image given the particular viewing conditions and desired visual effect. The light shielding areas block more transmitted light than the light transmitting areas.

In certain embodiments, the light transmitting areas are transparent or clear areas within the substrate. In other embodiments, the light transmitting areas are translucent areas within the substrate.

In some embodiments, the light shielding areas are opaque. The light shielding areas can be formed in the substrate by any means. Generally, the light shielding areas are formed either on a film using a light shielding layer or in a film using a light shielding additive to create a light shielding film. The light shielding area may also be mirror like, if the light shielding area is sufficiently specularly reflective. Light shielding layers include, for example, pigmented coating, metallic flakes, metallized coatings, double sided mirrors, etc. Light shielding additives include any opacifying filler, for example titanium dioxide, carbon black, calcium carbonate, metallic flakes, etc. Combinations and blends of additives and layers can also be used.

In certain embodiments, the light shielding areas are formed from a light shielding additive within a film. For example, a film has a light shielding additive within the film, creating a light shielding film. The light transmitting areas with such an embodiment may be formed by thinning the film in defined areas to allow the film to become light transmitting in those areas, even with the presence of the light shielding additive in the thin areas.

The substrate therefore has a certain planar area that is light transmitting within the plane of the first major surface. The area of the substrate that is light transmitting is generally less than about 90%, for example less than about 50%. In certain embodiments, the area of the substrate that is light transmitting is less than about 25%, for example less than about 15%. In specific embodiments, the area of the substrate that is light transmitting is greater than about 0.5%, for example greater than 1%.

The reflective image is generally created on the light shielding areas of a first major surface of the substrate. For example, the reflective image may result from a coating of pigmented ink on top of the light shielding areas. In certain embodiments, the pigmented ink has enough opacity to itself be a light shielding layer, and the coating of the ink creates the light shielding areas. In other embodiments, the ink is depositing on top of a separate light shielding layer. The reflective image may also be formed on the second major surface and viewable from the first major surface, creating light shielding areas. In such an embodiment, the pigmented ink is placed on the light shielding areas, and an optional light shielding layer is placed on top of the pigmented ink, opposite the first major surface.

The substrate also generally comprises a transmitted image. The transmitted image is generally created on the light transmitting areas of the second major surface of the substrate opposite the first major surface. The transmitted image may also be created by a printed image on the second major surface of the substrate. In other embodiments, the transmitted image is created by a projected light or image on the second major surface of the substrate. The projected image may be active or static. In another embodiment, the transmitted image is created using a transmissive film layer proximate the second major surface, and the transmitted image is on the transmissive film. The transmissive film may be, for example, a transparency film or a translucent film.

The substrate may act as a diffuser screen and be configured in a manner known in the art to receive a projected image or series of images from a projector and to display those images for viewing by viewer. The substrate may act as a diffuser screen by virtue of the materials used, e.g. a sufficient haze in the film used in the substrate, or with certain additives added to the film, for example titania, to diffuse light in the substrate.

In some embodiments, the first major surface of the substrate is a structured surface. In some embodiments, the second major surface of the substrate, opposite the first major surface, is a structured surface. In some embodiments, both major surfaces are structured.

A structured surface is a surface having deviations from planarity. Generally, the structured surface comprises a series of features, or deviations from planarity. The features may be any geometric shape. Examples of feature shapes include ridges, posts, pyramids, hemispheres and cones. The features may be protrusion features, i.e. they protrude out of the surface. In other embodiments, the features are recessed features, i.e. they recess within the surface. The protrusion features may have flat tops, pointed tops, truncated tops or rounded tops. The recessed features may have flat bases, pointed bases, truncated bases or rounded bases. The sides of any feature may be angled or perpendicular to the surface. In some embodiments, secondary features may exist on or within the features.

In some embodiments, the structured surface may have a pattern. The pattern can be regular, random, or a combination of the two. “Regular” means that the pattern is planned and reproducible. “Random” means one or more features of the structure are varied in a non-regular manner. Examples of features that are varied include for example, feature pitch, peak-to valley distance, depth, height, wall angle, edge radius, and the like. Combination patterns may for example comprise patterns that are random over a defined area, but these random patterns can be reproduced over larger distances within the overall pattern.

In some embodiments, the features may touch adjacent features at the plane (e.g. the base of a protrusion feature or the top of a recessed feature.) In certain embodiments, the structured surface comprises a series of microstructure features. A microstructure feature is a feature having at least two lateral dimensions (i.e. dimensions in the plane of the film) less than 55 mils (1.4 mm). The feature can be either a protrusion feature or a recessed feature. In some embodiments, the microstructure feature has at least one, for example two, lateral dimensions less than 40 mils (1.02 mm), for example less than 25 mils (635 micrometers). In specific embodiments, the microstructure feature has at least one, for example two, lateral dimensions less than 10 mils (254 micrometers). In certain embodiments, the microstructure feature has at least one, for example two, lateral dimensions greater than 1 micrometer, for example greater than 25 micrometer.

In certain embodiments, the first major surface defines a series of micro through-holes. A hole travels from the first major surface of the substrate to the second major surface of the substrate. A through-hole can have any dimension. A micro through-hole is a hole having at least two lateral dimensions (i.e. dimensions in the plane of the film) less than 55 mils (1.4 mm). In some embodiments, the micro through-holes have at least one, for example two, lateral dimensions less than 40 mils (1.02 mm), for example less than 25 mils (635 micrometers). In specific embodiments, the micro through-holes have at least one, for example two, lateral dimensions less than 10 mils (254 micrometers). In certain embodiments, the micro through-holes have at least one, for example two, lateral dimensions greater than 1 micrometer, for example greater than 25 micrometers.

In certain embodiments, the substrate is substantially continuous. Substantially continuous means, for the purpose of the present application, that the planar area of the substrate has less than 10% of the surface area removed by holes that travel from the first major surface of the substrate to the second major surface of the substrate.

The substrate generally includes at least one film layer. Generally, the film is a polymeric material. Suitable polymeric materials include, for example, polyolefinic materials (e.g. polypropylene or polyethylene), modified polyolefinic material, polyvinyl chloride, polycarbonate, polystyrene, polyester, polyvinylidene fluoride, (meth)acrylics (e.g. polymethyl methacrylate), urethanes, and acrylic urethane, ethylene vinyl acetate copolymers, acrylate-modified ethylene vinyl acetate polymers, ethylene acrylic acid copolymers, nylon, and engineering polymers such as polyketones or polymethylpentanes. The film may also be an elastomer. Elastomers include, for example, natural or synthetic rubber, styrene block copolymers containing isoprene, butadiene, or ethylene (butylene) blocks, metallocene-catalyzed polyolefins, polyurethanes, and polydiorganosiloxanes. Mixtures of the polymers and/or elastomers may also be used.

The film may comprise additives. Examples of such additives include, without limitation, stabilizers, ultraviolet absorbers, matting agents, optical brighteners and combinations to provide a desired physical or optical benefit.

The substrate may be a multilayer structure. In some embodiments, the structure features may be a separate layer from a base film layer. In some embodiments, the multilayer substrate may be a combination of light shielding film layers and light transmitting film layers, where the light shielding film layer possesses light transmitting areas.

In certain embodiments, the substrate comprises an image reception layer on at least one surface for receiving the reflected or transmitted image. In certain embodiments, the image reception layer may also serve as the light shielding layer. The composition of the image reception layer should be compatible with the desired imaging method (for example screen printing, ink jet printing, etc.). Generally, the image reception layer includes an ethylene vinyl acetate polymer (EVA), more preferably, an acid- or acid/acrylate-modified EVA polymer, or a carbon monoxide-modified EVA polymer, polyvinyl chloride, urethanes, (meth)acrylics, acrylic urethanes or combinations thereof.

Generally, the image reception layer is on the light shielding areas of the substrate. In such an embodiment, the image reception layer may also be the light shielding layer. In other embodiments, a light shielding layer is on the light shielding areas between the substrate surface and the image reception layer. In specific examples, the light transmitting areas are substantially free of the image reception layer.

In some embodiments, the substrate comprises a low surface energy layer on top of light transmitting areas. The low surface energy layer may be a separate layer or integral with the substrate. The low surface energy layer serves to reduce the wetting of any image to the light transmitting area and makes it easier to remove an image or ink from the light transmitting areas if it does wet. Examples of the low surface energy layer include, for example, silicones.

In other embodiments, the substrate comprises a weak boundary layer, for example a release coating, on top of light transmitting areas. A coating on the surface of the substrate would not adhere to the weak boundary layer. Therefore, the weak boundary layer serves to assist in clearing any coating from the light transmitting areas, thereby enhancing the light transmitting capability. Examples of a weak boundary layer include waxes, cellulosic layers, and low molecular weight silicones.

In some embodiments, the substrate comprises an adhesive layer. The adhesive layer may be on either the first major surface or the second major surface. In certain embodiments, the adhesive layer is over an image layer, either the reflective image or the transmitted image. A release liner may also cover the adhesive layer prior to use. Examples of suitable adhesives include (meth)acrylic adhesives, styrene block copolymer adhesives, and natural rubber resin adhesives, along with any optional tackifier, plasticizer or crosslinker. Examples of suitable release liners include silicone coated paper and polyester.

FIG. 1 represents a film made in an embodiment of the present invention. The substrate 10 comprises a light transmitting film 12. The substrate 10 has a first major surface 14. In the embodiment shown in FIG. 1, the first major surface 14 comprises a structure. The structure may be, for example, a microstructure.

A light shielding film 20 is bonded to the surface of the film 12. The light shielding film 20 creates light shielding areas 22 and light transmitting areas 24. Light is shown, as a wavy line, transmitting through the light transmitting areas 24. As stated above, in some embodiments, the light shielding film may be an opaque layer, and an image layer would be formed on the light shielding film. Additionally, FIG. 1 shows an embodiment of an image layer 26 on the second major surface of the substrate. Image layer 26 creates a transmitted image.

Figure 2:
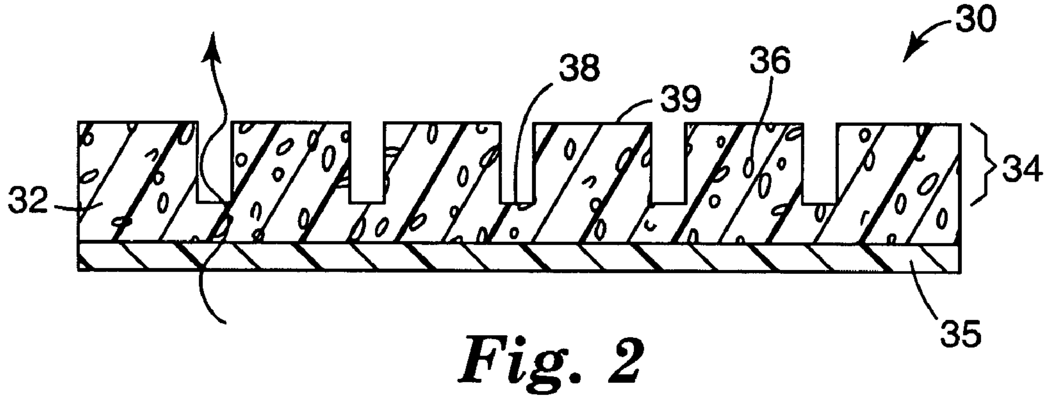
FIG. 2 is a cross sectional view of a film representing a second embodiment of the present invention.

FIG. 2 represents a film for use in an embodiment of the present invention. The substrate 30 comprises a film 32 on carrier web 35. The substrate 30 has a first major surface 34. In the embodiment shown in FIG. 3, the first major surface 34 comprises a structure. The structure may be, for example, a microstructure. The film 32 additionally comprises a light shielding additive 36. The structure and the light shielding additive creates light transmitting areas 38 and light shielding areas 39. In this embodiment, the structure thins the film in the light transmitting areas enough to allow the film to become light transmitting. The light transmitting areas 38 are generally depressions within the film 32. Light is shown, as a wavy line, where the light would transmit through the light transmitting areas 38 after removal of the carrier web 35.

Figure 3:
FIG. 3 is a cross sectional view of a film representing a third embodiment of the present invention.

FIG. 3 represents a film for use in an embodiment of the present invention. The film 52 comprises a series of through-holes 54. The film 52 is generally a light shielding film.

Figure 4:
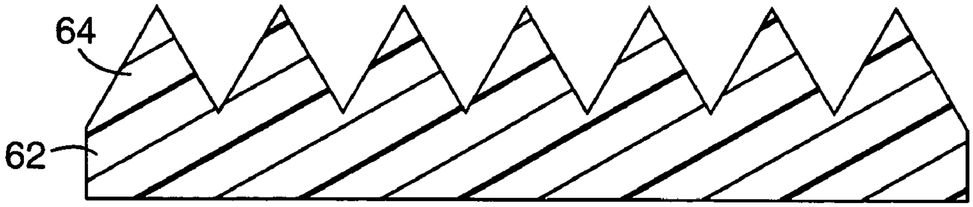
FIG. 4 is a cross sectional view of a film representing a fourth embodiment of the present invention.

FIG. 4 represents a film 62 for use in an embodiment of the present invention. The film comprises a structured surface 64. The structured surface comprises a series of pyramids.

The substrate can be manufactured using a variety of methods. In one embodiment, a light shielding film is provided. The light shielding film can be any film described above, including a multilayer film. For example, in some embodiments the light shielding film is multilayer, with at least one white layer and one black layer. In other embodiments, the multilayer light shielding film has a black layer between two white layers. In some embodiments, the light shielding film is on a carrier web, for example a release liner.

In some embodiments, the light shielding film includes an image on the surface of the light shielding film. The image may be on the surface opposite the structured surface or on the surface of the light shielding film adjacent to the structured surface.

The light shielding film is then placed in contact with a structured surface. The structured surface may be a tool for embossing or a structured film. In certain embodiments the structured film may be a light transmitting film. In some embodiments, the structured surface extends through the light shielding film, making the light shielding film discontinuous.

In the embodiment where the structured surface is another film, the films may then be bonded to form a composite film. Generally, the light shielding film is in contact with the structured surface of the film. In other embodiments, the two films are in contact and then the surface of the composite film is structured to leave thin enough portions to provide light transmitting areas. The surface may be structured using a variety of methods, including, for example, embossing. After bonding and structuring, the light shielding film comprises light transmitting areas. In some embodiments, the light shielding film is discontinuous, and in other embodiments, the light shielding film is continuous, but is thin enough in some areas to allow light transmission.

The films may be bonded using a variety of methods. The methods include, for example, bonding with an adhesive or laminating the films together. In embodiments where a light shielding film is heat laminated to a structured film, such as a light transmitting film, the structured film may have a softening point higher than the softening point of the light shielding film in order to allow the structured film to deform the light shielding film.

The light shielding film may comprise an image. In embodiments where the light shielding film is on a carrier web, the carrier web may be removed. Removal of the carrier web may result in material from the light shielding film remaining on the carrier web, creating a discontinuous light shielding film. For example, the material thinned by the contact with the structure may remain on the carrier web. The discontinuous light shielding film has a series of through-holes as defined above. In some embodiments, the carrier web is removed after the light shielding film is printed with an image. In such an embodiment, ink in the thinned areas would remain on the carrier web in addition to the material from the light shielding film.

In embodiments where the light shielding film is bonded to a light transmitting film, the light shielding film may be printed with an image on the surface opposite the light transmitting film. As stated above, in some embodiments, the light shielding film is discontinuous, and the light transmitting film penetrates to the surface of the composite film being printed. In such embodiments, the light transmitting film may comprise a low surface energy layer or a weak boundary layer as described above in order to allow the printed image to be removed from the light transmitting areas.

In other embodiments, the light transmitting film is a molten polymer film. In some embodiments, both the light transmitting film and the light shielding film are molten polymer films. The molten films are formed by conventional means in an extruder, which melts the resin and moves the heated resin to a die. The die extrudes the resin as a wide ribbon of material onto a mold surface, such as a nip cylinder or another film. In some embodiments, the light shielding film and the light transmitting film are co-extruded. In other embodiments, one the films is not extruded, but is already in film form.

The nip may have at least one structured surface. The structured nip surface may comprise an array of cavities or protrusions in the surface of the nip. In some embodiments, the nip comprises two cylinders, and the films pass between the cylinders. In such an embodiment, one or both of the surfaces may be structured. In an embodiment with only one structured surface in the nip, the light shielding film enters the nip on the side with the structure.

The substrate can be used in a variety of methods. Generally, an illumination source is provided. A substantially continuous substrate is placed between the illumination source and the viewer, wherein the substrate comprises light shielding areas and light transmitting areas. In other embodiments, substrate has a series of micro through-holes having at least two lateral dimensions less than 55 mils (1.4 mm).

A reflective image exists on the substrate opposite the illumination source and a transmitted image exists between the substrate and the illumination source. The reflective image is visible with the illumination source off and the transmitted image is visible with the illumination source on. For example, the reflective image may be a printed image, and the transmitted image may be a printed image, an image on a transparency or a projected image as discussed above.

Generally, in a front light condition, the reflective image is visible only when the illuminated light source is off, and the transmitted image is visible only when illuminated light source is on.

The substrate is useful in a variety of applications. For example, the substrate may have a reflective image that is a solid color. The solid color may match a surrounding environment and camouflage a transmitted image, which is only visible when the illumination source is on. Specific examples include camouflaging the brake lights of an automobile, or camouflaging the interior overheads lights of an automobile. Warning, cautionary, directional and advertisement signs could also be camouflaged until needed.

Another application is in dual graphics or signage. The substrate may have a reflective visual image that imparts signage information. This sign would then be visible in a front light condition. The sign could then be easily changed to a different sign in a back light condition. For example, a static sign displays during the day (front light) and at night, a projected active sign is the transmitted image on the same substrate.

Various modifications and alterations of the present invention will become apparent to those skilled in the art without departing from the spirit and scope of the invention.

What is claimed is:

1. A method of manufacturing an article comprising
providing a substantially continuous light shielding film;
providing a light transmitting film having a structured surface; and
contacting the light shielding film with the structured surface of the light transmitting film to form a composite film with a light shielding layer and a light transmitting layer, comprising an image on the surface opposite the light transmitting layer,
wherein after contacting, the composite film has light transmitting areas and light shielding areas, such that more light is transmitted through an entire thickness of the composite film in the light transmitting areas than in the light shielding areas.

2. The method of claim 1 comprising bonding the light shielding film to the structured surface of the light transmitting film.

3. The method of claim 1 wherein, after contacting, the light shielding film layer is discontinuous.

4. The method of claim 1 wherein, after contacting, the light shielding film layer is substantially continuous.

5. The method of claim 1, further comprising removing the light transmitting film from the light shielding layer.

6. The method of claim 1 wherein the structured surface of the light transmitting film is coated with an ink release coating.

7. The method of claim 1 wherein the light transmitting layer further comprises an image on the surface opposite the light shielding layer.

8. The method of claim 1 wherein the light shielding film is multilayer.

9. A method of manufacturing an article comprising providing a substantially continuous light shielding film;

providing a carrier web;

contacting the light shielding film with the carrier web;

structuring the surface of the light shielding film opposite the carrier web, wherein after structuring, the light shielding film has areas that are sufficiently thin to transmit light through an entire thickness of the light shielding film and thereby form light transmitting areas;

printing an image on the light shielding film on the surface opposite the carrier web; and removing the carrier web, wherein at least a portion of the light transmitting areas remain on the carrier web.

10. The method of claim 9 wherein the areas remaining on the carrier web result in through-holes in the light shielding film.

11. The method of claim 9 comprising printing the surface of the light shielding film opposite the carrier web before removing the carrier web.

12. The method of claim 9 comprising printing the surface of the light shielding film opposite the carrier web before structuring the light shielding film.

13. The method of claim 9 wherein, after removing the carrier web, the light shielding layer comprises a series of through-holes.

14. The method of claim 9 wherein, after removing the carrier web, the light shielding layer comprises a series of micro through-holes.

15. The method of claim 9 wherein, after removing the carrier web, the light shielding film is specularly transmissive.

16. The method of claim 9 wherein, after removing the carrier web, the light shielding film is not specularly transmissive.

17. A method of manufacturing an article comprising providing a substantially continuous light shielding polymer film having a printed reflective image;

providing a substantially continuous light transmitting molten polymer film;

introducing the light shielding molten polymer film and the light transmitting molten polymer film to a structured surface, wherein the structured surface contacts the light shielding film;

forming a substantially continuous composite film on the structured surface, wherein the composite film comprises light shielding areas and light transmitting areas, such that more light is transmitted through an entire thickness of the composite film in the light transmitting areas than in the light shielding areas; and removing the composite film from the structured surface.

18. The method of claim 17 further comprising cooling the composite film after removing the composite film from the structured surface.

19. The method of claim 17 wherein the structured surface is in a nip.

20. The method of claim 17 wherein the light shielding film is a molten polymer.

21. The method of claim 17 wherein the light shielding film is a pre-formed film.

22. The method of claim 17 wherein the composite film has a structured surface.

23. The method of claim 17 wherein the light shielding film is multilayer.

24. The method of claim 19 wherein the nip has a second surface and the second surface is smooth.

25. The method of claim 19 wherein the nip has a second surface in addition to the structured surface and the second surface is structured.

26. The method of claim 20 wherein the light shielding molten polymer film and the light transmitting molten polymer film are coextruded before the nip.

* * * * *